(12) United States Patent
Byun

(10) Patent No.: US 8,380,261 B2
(45) Date of Patent: Feb. 19, 2013

(54) SLIDING-TYPE MOBILE TERMINAL WITH A SLIDING CRADLE, SLIDING GUIDE MODULE THEREOF AND MECHANISM FOR MOUNTING SLIDING GUIDE MODULE

(75) Inventor: Chang-Heum Byun, Gumi-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 804 days.

(21) Appl. No.: 11/713,019

(22) Filed: Mar. 2, 2007

(65) Prior Publication Data
US 2007/0259703 A1    Nov. 8, 2007

(30) Foreign Application Priority Data
May 8, 2006  (KR) .................... 10-2006-0041223

(51) Int. Cl.
*H04M 1/00* (2006.01)
(52) U.S. Cl. .................. 455/575.4; 455/575.1
(58) Field of Classification Search ..... 455/575.1–575.8
See application file for complete search history.

(56) References Cited

U.S. PATENT DOCUMENTS

| | | | |
|---|---|---|---|
| 4,878,237 A | 10/1989 | Cianflone | |
| 6,754,514 B1 | 6/2004 | Nakamura | |
| 2002/0132640 A1 | 9/2002 | Hyun et al. | |
| 2005/0049019 A1* | 3/2005 | Lee ............................ | 455/575.4 |
| 2005/0227737 A1 | 10/2005 | Moon et al. | |
| 2005/0250532 A1* | 11/2005 | Hwang et al. ............. | 455/550.1 |
| 2005/0277451 A1* | 12/2005 | Ku ............................. | 455/575.4 |
| 2006/0217163 A1* | 9/2006 | Ohmori ...................... | 455/575.1 |
| 2006/0229115 A1* | 10/2006 | Puranen ..................... | 455/575.1 |
| 2006/0287011 A1* | 12/2006 | Chiu .......................... | 455/575.1 |
| 2007/0091555 A1* | 4/2007 | Lee ............................. | 361/683 |

FOREIGN PATENT DOCUMENTS

| | | |
|---|---|---|
| EP | 1 594 293 A | 11/2005 |
| EP | 1 496 674 A | 12/2005 |
| JP | 2005-207562 | 8/2005 |
| KR | 20-0330245 | 10/2003 |
| KR | 20-0372903 | 1/2005 |
| KR | 10-2005-0036349 | 4/2005 |
| KR | 20-0394697 Y1 | 8/2005 |
| KR | 10-2005-0109445 A | 11/2005 |
| KR | 10-0537698 B1 | 12/2005 |
| KR | 100 537 698 B1 | 12/2005 |
| WO | WO 2005-076487 A | 8/2005 |
| WO | WO 2005-009515 A | 9/2005 |
| WO | WO 2006-107129 A1 | 10/2006 |

* cited by examiner

*Primary Examiner* — Chuong A Ngo
(74) *Attorney, Agent, or Firm* — Roylance, Abrams, Berdo & Goodman, LLP

(57) ABSTRACT

A mobile terminal includes a main body having a front and a back surface. A sliding body is mounted on the main body so as to be slid face-to-face along the main body. The sliding body has a front surface with at least a key and a display and a back surface. A cradle means is connected to the sliding body so as to be pivoted between a flat position contacting the back surface of the main body and a slanted position spaced away from the back surface of the main body for supporting the main body and sliding body at an angle. A sliding guide module guides the sliding motion of the sliding body face-to-face along the main body.

30 Claims, 12 Drawing Sheets

SLIDING-TYPE MOBILE TERMINAL WITH A SLIDING CRADLE, SLIDING GUIDE MODULE THEREOF AND MECHANISM FOR MOUNTING SLIDING GUIDE MODULE

CROSS-REFERENCE TO RELATED APPLICATION

This application claims the benefit under 35 U.S.C. §119 (a) of an application entitled "Mobile Terminal with a Sliding Cradle, Sliding Guide Module Thereof and Mechanism for Mounting Sliding Guide Module" filed in the Korean Intellectual Property Office on May 8, 2006 and assigned Serial No. 2006-41223, the entire contents of which are hereby incorporated by reference.

BACKGROUND OF THE INVENTION

1. Field of the Invention

The present invention relates to a mobile terminal such as a DMB phone, a game phone, a chatting phone, a camera phone, a MP3 phone, a cellular phone, a PCS, a PDA (Personal Digital Assistant), and a HHP (Hand Held Phone). More particularly, the present invention relates to a cradling mechanism for a mobile terminal.

2. Description of the Related Art

Originally, mobile terminals were intended to enable users to communicate with others through radio communications. Recently, however, they have been developed to accommodate various requirements for multimedia and internet environments, in addition to basic voice communication. Further, mobile terminals have become more compact, lighter, and slimmer. Conventional mobile terminals may be classified as bar-types, flip-types, or folder-types according to the structure of their external housing. A bar-type terminal has a single bar-like housing, a flip-type terminal has a flip which is hinged to a bar-like housing, and a folder-type terminal has a folder which is hinged to a bar-like housing. Mobile terminals may also be classified as neck wearable type terminals (which are worn around the neck) or wrist wearable type terminals (which are worn around the wrist). In addition, mobile terminals may be classified as rotation-type or sliding-type terminals. A rotation-type terminal consists of two housing parts that may be turned relative to each other for opening or closing while maintaining the face-to-face contacting relationship of the housing parts. A sliding-type terminal consists of two housing parts that may be slid longitudinally relative to each other for opening or closing. Finally, mobile terminals have been developed to exchange large amounts of data at high speed.

Conventional mobile terminals have various drawbacks. For example, if the user wishes to watch the display of a mobile terminal that is resting on a table, it is desirable to have an additional support for supporting the mobile terminal in a slanted position to improve the viewing angle. Moreover, when a user wishes to enjoy a moving picture displayed on the screen of the mobile terminal that is resting on a table, he must be satisfied both visually and acoustically. In this case, it is important to support the mobile terminal in a slanted position because both visual and acoustic effects are most effective in that position.

Typically, the battery charger of a mobile terminal has served as a cradle for supporting the mobile terminal on a table in a slanted position during the charging process. However, the battery charger is too cumbersome for the user to carry to use it as a cradle outside of home.

Accordingly, there is a need for an improved mobile terminal with a cradle for supporting the mobile terminal in a slanted (e.g., inclined) position.

SUMMARY OF THE INVENTION

An object of the present invention is to address at least the above problems and/or disadvantages and to provide at least the advantages described below. Accordingly, an object of the present invention is to provide a mobile terminal with a sliding cradle that enables the mobile terminal to be quickly and easily supported on a table.

It is another object of the present invention to provide a mobile terminal with an oblique flat lower end surface for stabilizing the position of the mobile terminal supported by the cradle on a table.

It is still another object of the present invention to provide a sliding guide module symmetrically arranged in the main body of a mobile terminal for stabilizing the opening and closing motion.

It is a further object of the present invention to provide a mobile terminal comprising a main body, a sliding body, and a sliding guide module for guiding the sliding body face-to-face along the sliding body wherein the sliding guide module is provided with a resilient member for enabling the user to stably and manually slide the sliding body along the main body by a desired distance.

It is another object of the present invention to provide a mobile terminal comprising a main body, a sliding body, and a sliding guide module for guiding the sliding body face-to-face along the sliding body wherein the sliding guide module is mounted in the main body by means of a mechanism including a guide reinforcement part for stabilizing the sliding motion thereof.

It is still a further object of the present invention to provide a mobile terminal comprising a main body, a sliding body, and a cradle means that can be supported by the cradle means regardless of the sliding motion of the sliding body.

According to an aspect of the present invention, a mobile terminal comprises a main body, a sliding body, a cradle means, and a sliding guide module. The main body has a front and a back surface. The sliding body is mounted on the main body so as to be slid face-to-face along the main body, and the sliding body has a front surface a back surface. The cradle means is connected to the sliding body so as to be pivotable between a flat position contacting the back surface of the main body and a slanted position pivoted away from the back surface of the main body for supporting the main body and the sliding body in a slanted position. The sliding guide module guides the sliding motion of the sliding body face-to-face along the main body.

According to another aspect of the present invention, a mobile terminal includes a main body, a sliding body opened or closed with respect to the main body, and a sliding guide module connecting the main body and the sliding body so as to hold them face-to-face. The sliding guide module comprises a guide member, a guided part mounted on the guide member so as to be guided along it, and a resilient member arranged at a given region of the guide member for restraining free sliding motion of the guided part along the guide member.

According to still another aspect of the present invention, there is provided a mechanism for mounting a sliding guide module for connecting a main body and a sliding body so as to hold them face-to-face. The sliding guide module has a guide member and a guided part mounted on the guide member so as to be guided along it. The mechanism comprises a guide reinforcement part for structurally reinforcing the guided part and for supporting the movement of the guide member, a first guide step integrally formed with the guided part for slidably contacting the guide reinforcement part, and a second guide step integrally formed with the guide reinforcement part so as to engage the first guide step.

BRIEF DESCRIPTION OF THE DRAWINGS

The above and other objects, features, and advantages of certain exemplary embodiments of the present invention will be more apparent from the following description taken in conjunction with the accompanying drawings, in which.

Throughout the drawings, the same reference numerals will be understood to refer to the same elements, features, and structures.

DETAILED DESCRIPTION OF THE EXEMPLARY EMBODIMENTS

The matters defined in the description such as a detailed construction and elements are provided to assist in a comprehensive understanding of the embodiments of the invention and are merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

Referring to FIGS. 1 to 9, the mobile terminal of an exemplary embodiment of the present invention comprises a main body 10, a sliding body mounted on the main body so as to be slid between opened and closed positions, a sliding guide module 30 connecting the main body 10 and sliding body 20 so as to slide the sliding body face-to-face along the main body, and a cradle device 40 for supporting the main body 10 together with the sliding body 20 in a slanted (e.g., inclined) position.

Figure 3:
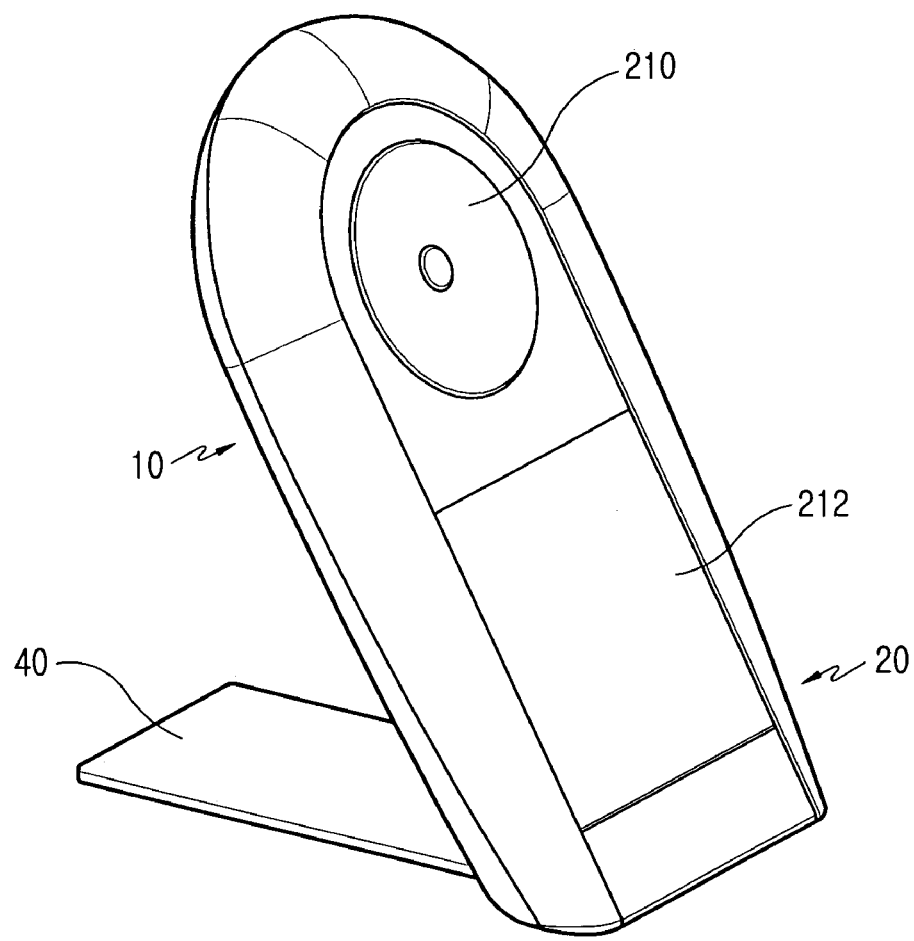
FIG. 3 is a perspective view of the mobile terminal of FIG. 1 resting in a slanted position.
Figure 4:
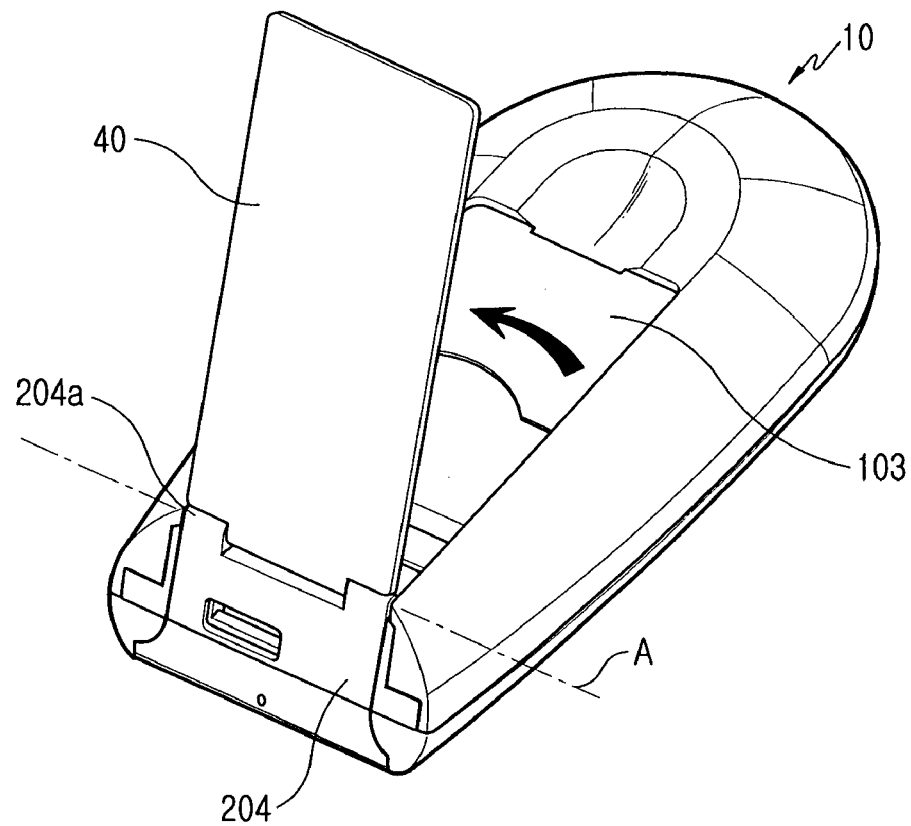
FIG. 4 is a perspective view of the mobile terminal of FIG. 1 resting in a slanted position taken in an obliquely upward direction from below.
Figure 5:
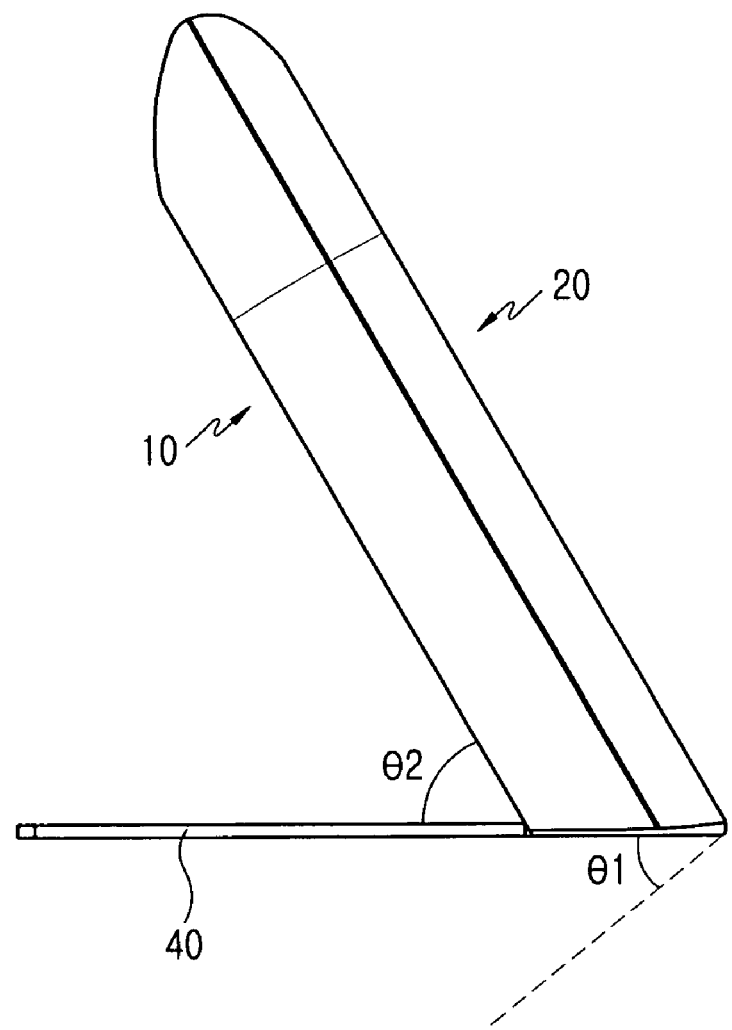
FIG. 5 is a side view of the mobile terminal of FIG. 1 resting in a slanted position.
Figure 6:
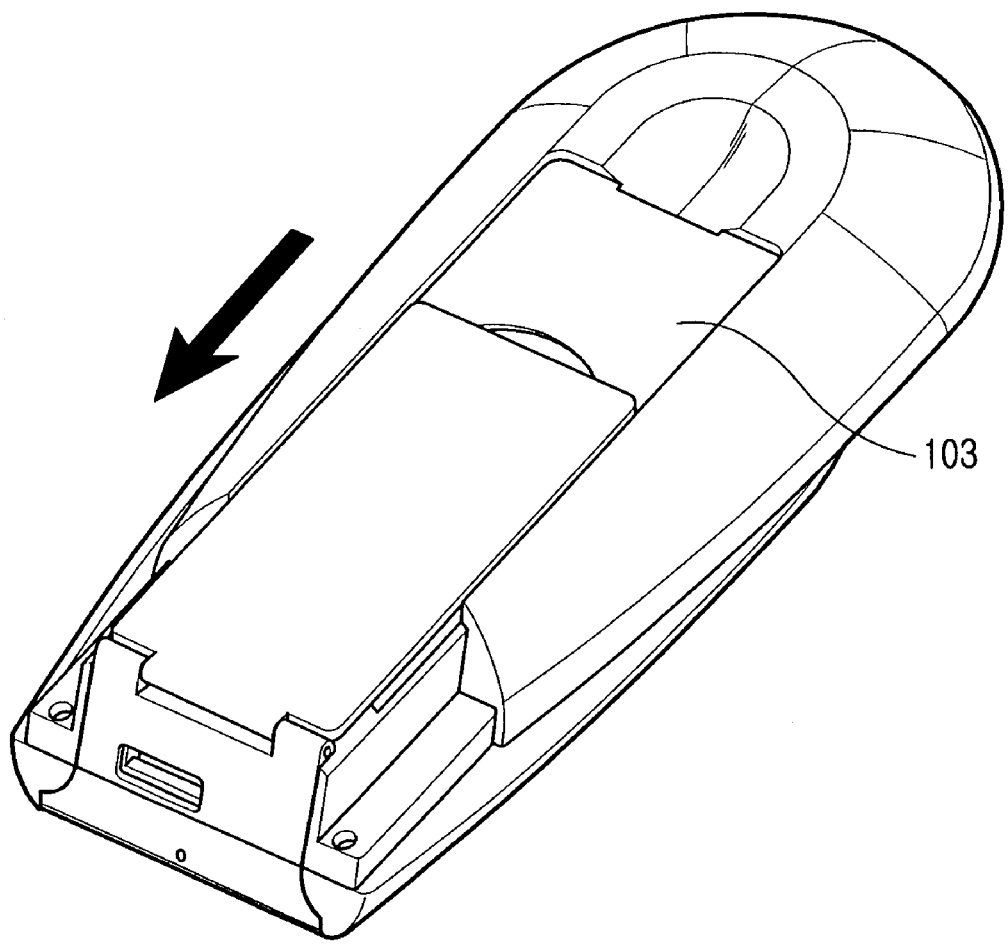
FIG. 6 is a perspective view of the mobile terminal of FIG. 1 with a cradle means slid toward the opening direction.

The sliding body 20 is designed so as to be slid face-to-face on the front surface 101 (shown in FIG. 8) to open or close a region of the front surface 101. The opened region of the front surface 101 may be flat and may be provided with a plurality of keys (not shown). The cradle device 40 is connected to the sliding body 20 by means of a pivot "A" (shown in FIG. 4) and is pivoted off the back surface 102 of the main body so as to support the main body together with the sliding body 20 in a slanted position on a table or other substantially horizontal plane as shown in FIGS. 3 and 5. The sliding body 20 is designed so as to slide linearly together with the cradle device.

Figure 7:
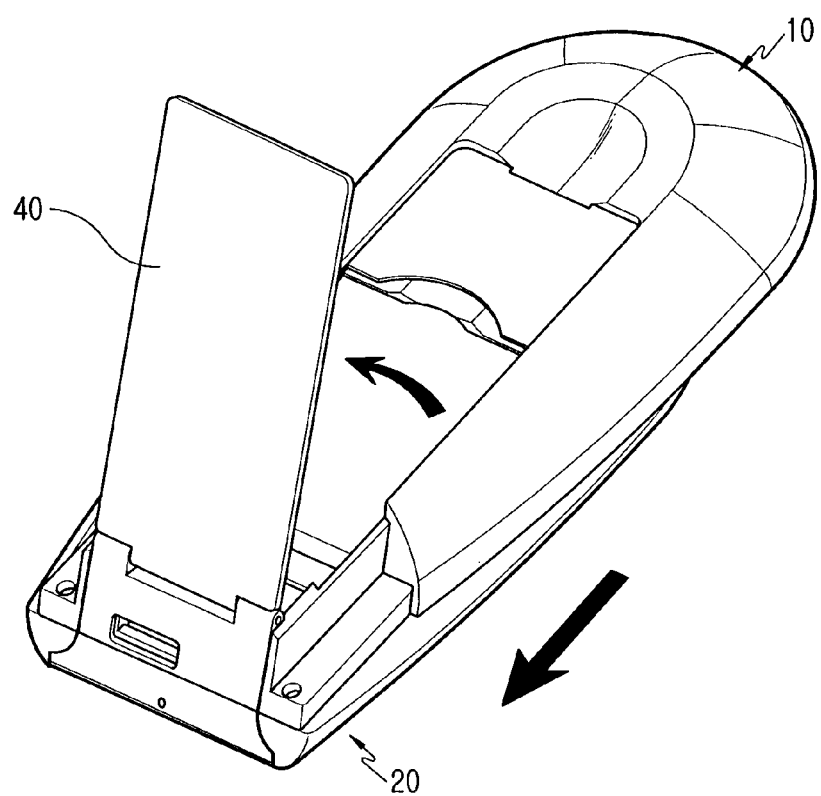
FIG. 7 is a perspective view of the mobile terminal of FIG. 1 with a cradle means slid toward the opening direction and pivoted off the main body.

The cradle device 40 follows the sliding motion of the sliding body 20 so as to open or close a region of the back surface 102 of the main body. The cradle device 40, as shown in FIGS. 4 and 7, is designed to be pivoted off the back surface 102 regardless of the sliding motion of the sliding body 20. Namely, the cradle device 40 is slid along with the sliding body 20 because it is fastened to the sliding body 20 by means of a pivot. The back surface 102 of the main body is opened and closed in the following two methods. First, the cradle device 40 may be pivoted about the pivot "A" away from or toward the back surface 102 so as to open or close it fully as shown in FIGS. 3 and 4. Second, the sliding body 20 along with the cradle device 40 may be slid to open or close a portion of the back surface 102 of the main body. Of course, the cradle device 40 may be pivoted to open or close fully the back surface 102 after completing the sliding motion of the sliding body.

Figure 1:
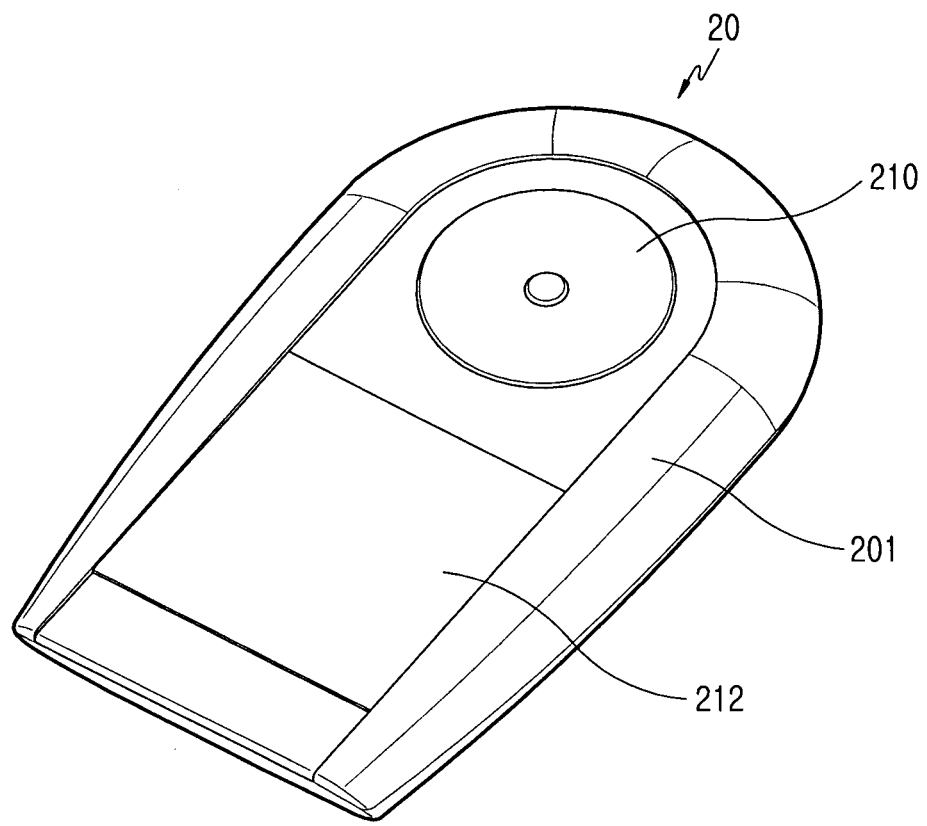
FIG. 1 is a perspective view of the front surface of a mobile terminal according to an exemplary embodiment of the present invention.
Figure 2:
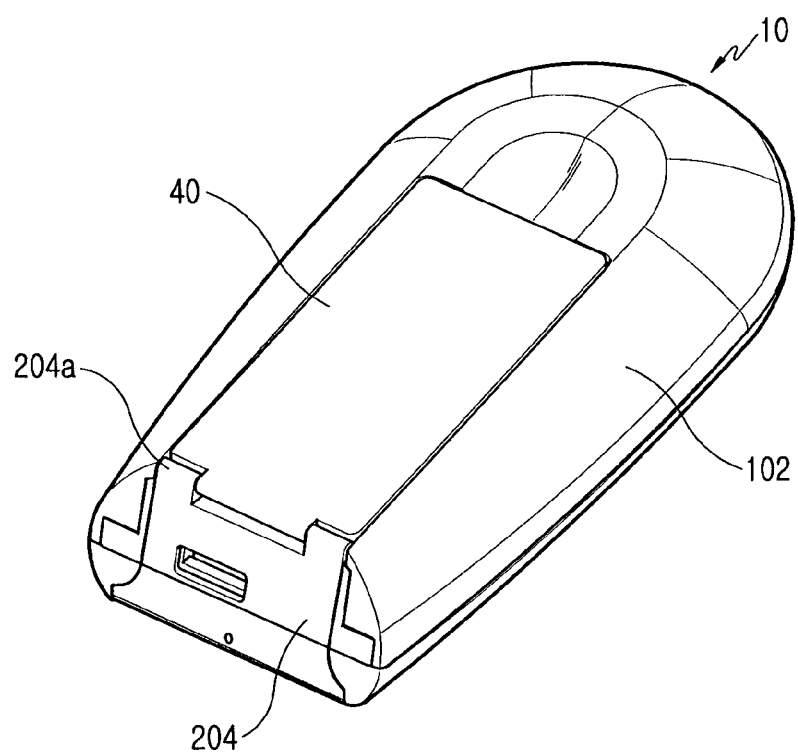
FIG. 2 is a perspective view of the back surface of the mobile terminal shown in FIG. 1.
Figure 8:
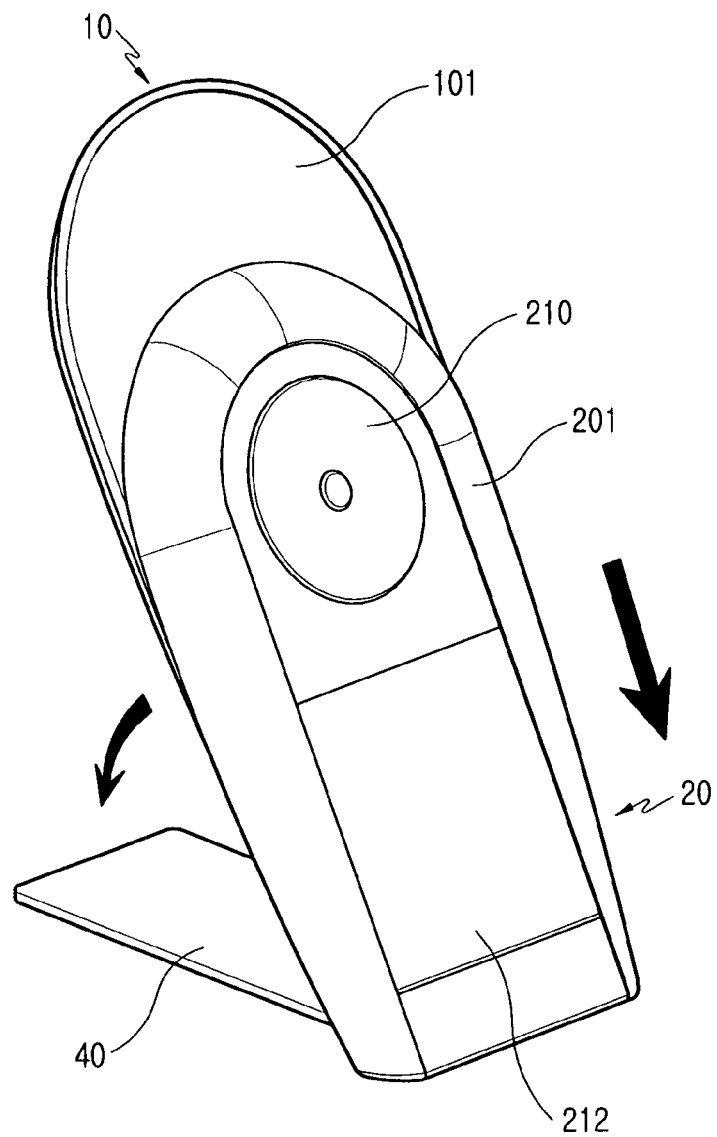
FIG. 8 is a perspective view of the mobile terminal of FIG. 1 resting in a slanted position after being slid.
Figure 9:
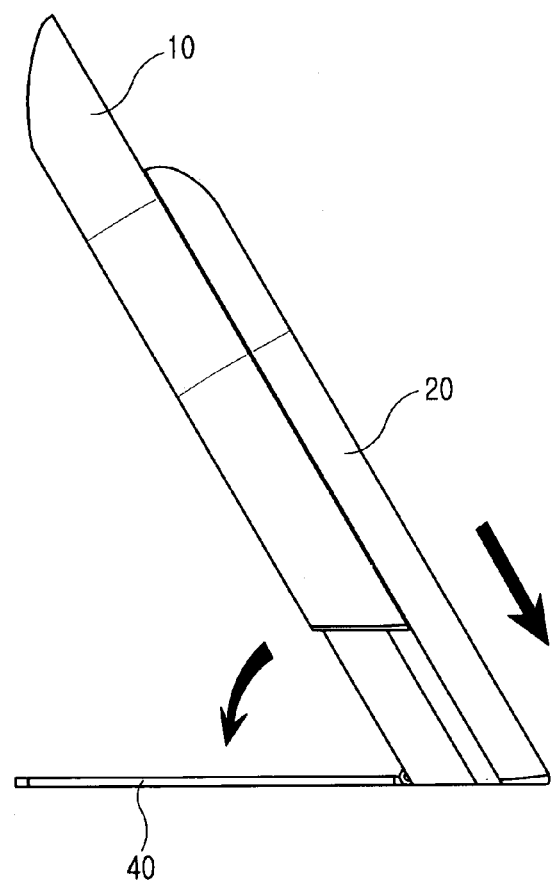
FIG. 9 is a side view of the mobile terminal of FIG. 1 resting in a slanted position after being slid.

As shown in FIG. 2, the cradle device 40 is shaped like a plate. When the cradle device 40 is closed and securely inserted in a recess 103 formed in the back surface 102 of the main body to nearly form a plane with the back surface 102. The cradle device 40 is pivoted around a pivot "A" provided at an edge 204a of the lower end 204 of the back surface of the sliding body 20, as shown in FIGS. 2 and 4. The lower end 204 of the back surface of the sliding body 20 is formed as an oblique flat end surface whose slant angle determines the support angle of the cradle 40 supporting the mobile terminal in the slanted position. The sum of the slant angle $\theta 1$ of the lower end 204 and the pivoting angle $\theta 2$ is 90 degrees. As shown in FIGS. 1 and 8, the front surface 201 of the sliding body 20 is provided with at least a key 210 and a display 212 respectively arranged at the upper and lower parts thereof. The display 212 may be arranged below the key 210.

Figure 10:
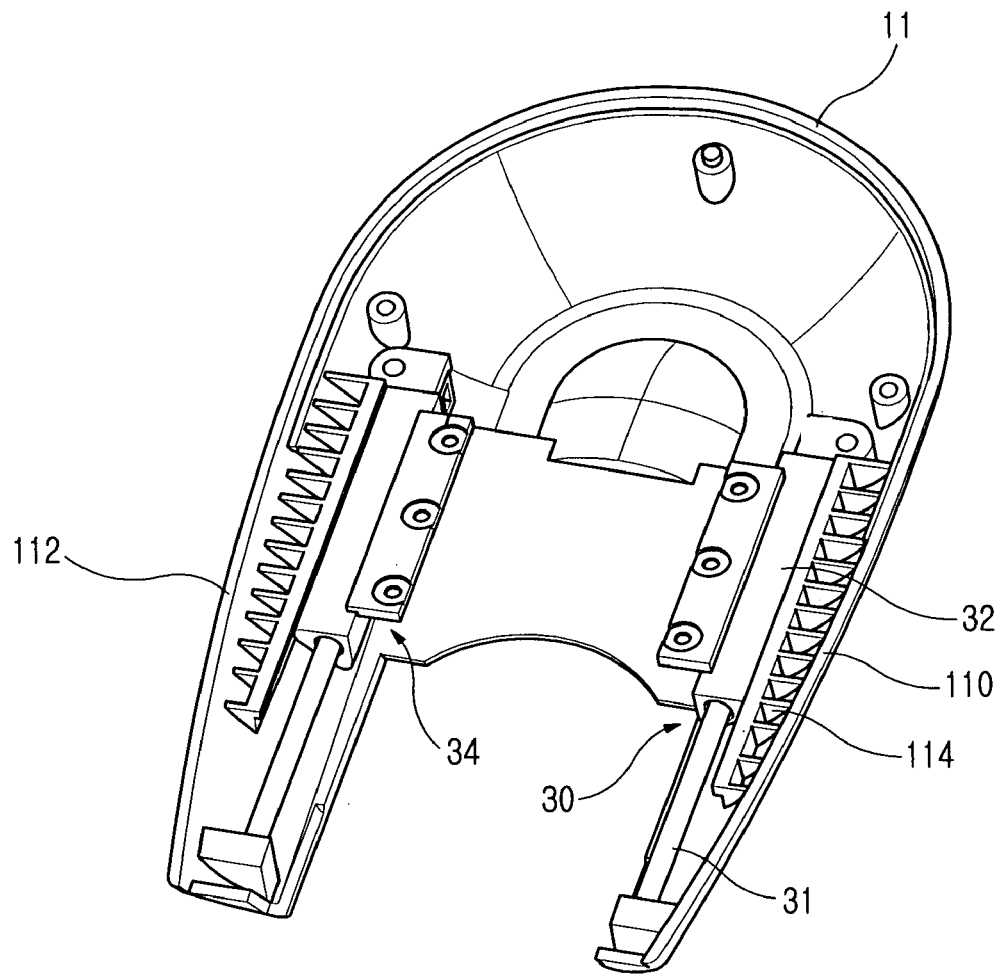
FIG. 10 is a perspective view of a sliding guide module mounted in the mobile terminal of FIG. 1.
Figure 11:
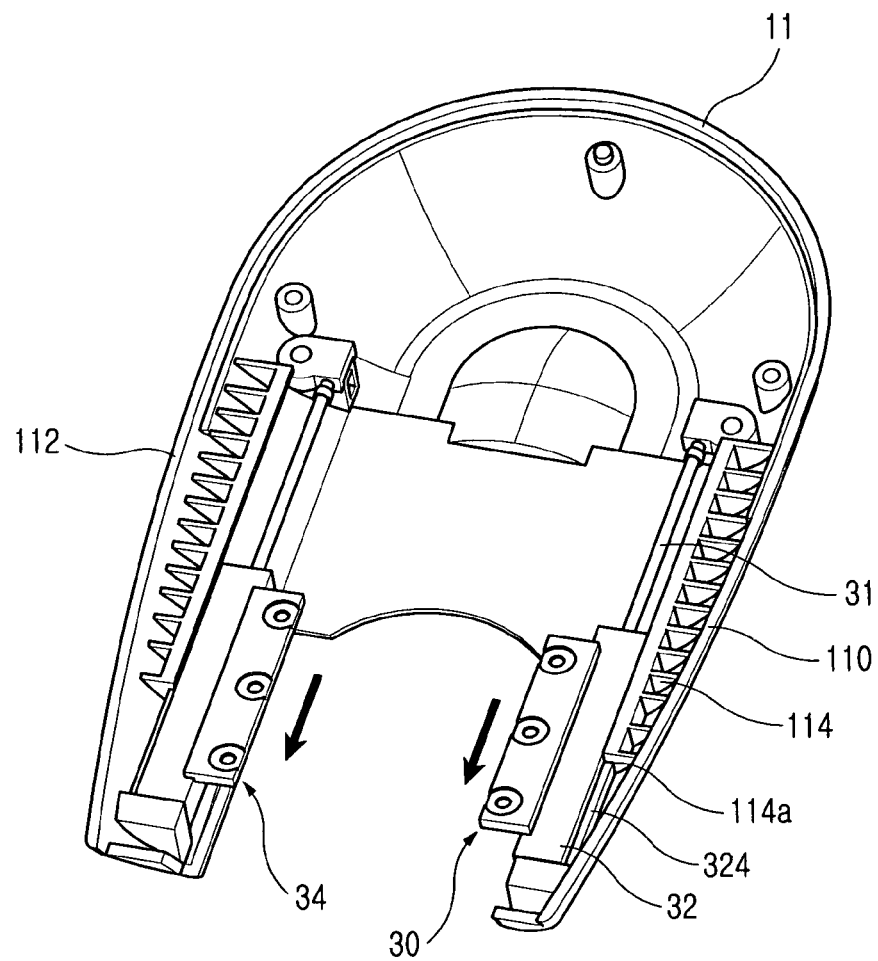
FIG. 11 is a perspective view of a sliding guide module mounted in the mobile terminal of FIG. 1 with the guided part of the sliding guide module being slid toward the opening direction.
Figure 12:
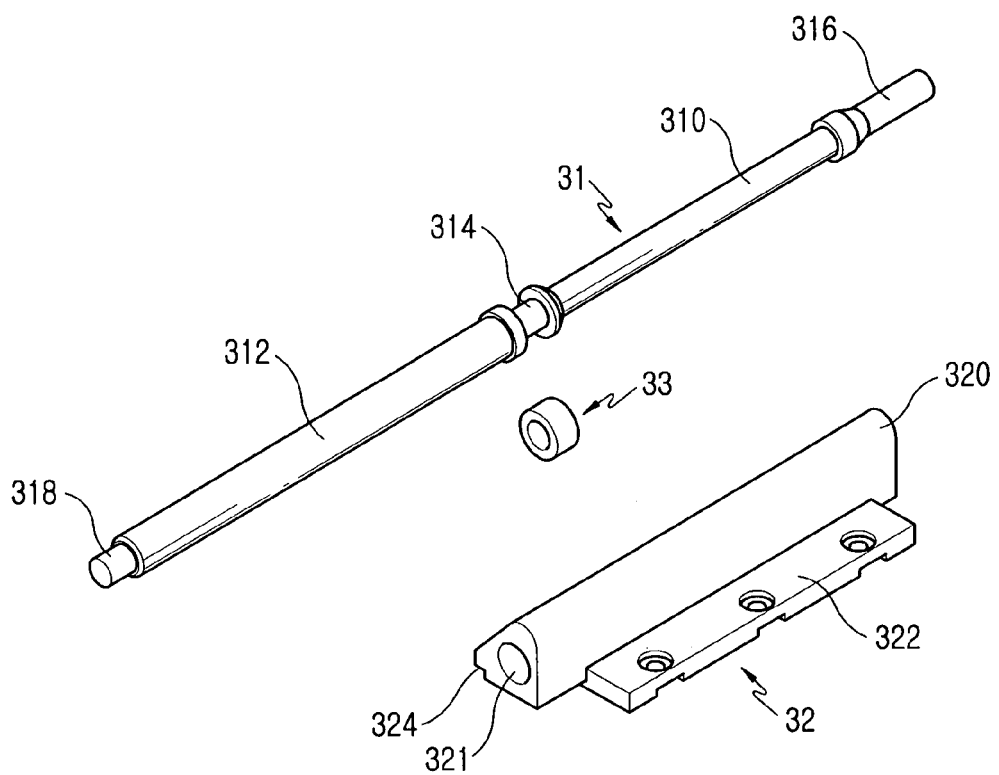
FIG. 12 is an exploded perspective view of the sliding guide module of the mobile terminal of FIG. 1.

Referring to FIGS. 10 to 12, the sliding guide module parts 30 and 34 are symmetrically mounted in guide module housings 110 and 112 that extend along the sliding direction of the sliding body 20, so that the sliding body 20 may be stably slid face-to-face along the main body. Hereinafter, one of the sliding guide module parts 30 and 34 will be described to avoid duplicative description because the two module parts have basically the same structure.

As illustrated in FIG. 10, the guide member module 11 includes guide module parts 30, 34. The guide module part 30 comprises a guide member 31 mounted in the module housing 110, a guided part 32 for fastening the sliding body, the guided part being moved along the guide member 31, and a resilient member 33 mounted at a given region of the guide member 31 for restraining the sliding motion of the guided part 32. The guide member 31 is shaped like a rod inserted in a reception opening 321 (shown in FIG. 12) formed in the body 320 of the guided part, so that the guided part 32 may be guided along the guide member 31. The guide member 31 comprises a first and a second region 310 and 312 having different diameters, a third region 314 formed between the first and second regions 310 and 312 for stably receiving the resilient member 33, and a pair of fixture ends 316 and 318 that extend outside the first and second regions 310 and 312, respectively. The fixture ends 316 and 318 are mounted in support protuberances formed in the module housing 110.

The resilient member 33 is mounted in the third region 314 so as to tightly restrain the sliding motion of the guided part 32 along the guide member 31. This is to prevent the guided part 32 from freely sliding along the guide member 31 without an external force applied. The resilient member 33 may be a ring tightly mounted around the third region 314. The outer diameter of the resilient member 33 is designed to be larger than the largest diameter of the guide member 31, so that the guided part 32 is tightly held on the guide member 31. Thus, the guided part 32 can be slid by applying an external force to the resilient member 33.

Referring to FIGS. 10 to 12, the mechanism of mounting the sliding guide module part 30 comprises a guide reinforcement part 114 for structurally reinforcing the guided part 32 and for supporting the sliding motion of the guide member 31, a first guide step 324 integrally formed with the body 320 of the guided part 32 for slidably contacting the guide reinforcement part 114, and a second guide step 114a integrally formed with the guide reinforcement part 114 so as to engage the first guide step 324 face-to-face. The first and second guide steps 324 and 114a are designed to extend along the guided part 32 and guide reinforcement part 114, respectively. The guided part 32 further includes a fastening piece 322 that extends lengthwise for fastening the guided part 32 to the sliding body by means of fasteners such as screws or bolts (not shown). The guided part 32 and guide member 31 are preferably formed of metal. The guide reinforcement part 114 is preferably formed integrally with the guide housing 110 by injection molding.

As shown in FIGS. 3 and 8, the mobile terminal that rests on a table in a slanted position (e.g., inclined) enables the user to comfortably watch the information presented on the display 212. The cradle device 40 may be pivoted off the back surface 102 of the main body by either a manual or automatic device. Of course, the automatic device is achieved by employing a conventional motor.

As described above, the exemplary embodiment of the present invention provides a mobile terminal with a cradle integrally formed therewith for enhancing convenience when resting the mobile terminal in a slanted position on a table. Furthermore, the exemplary embodiment of the present invention provides a resilient member for stabilizing the sliding motion of the sliding body. The first and second guide steps also stabilize the sliding motion of the sliding body.

While the invention has been shown and described with reference to certain embodiments thereof, it will be understood by those skilled in the art that various changes in form and details may be made therein without departing from the spirit and scope of the invention as defined by the appended claims.

What is claimed is:
1. A mobile terminal comprising:
a main body;
a sliding body mounted on said main body, said sliding body being slidable along a longitudinal length of said main body;
a cradle pivotably connected to said sliding body, said cradle being pivotable between a flat position wherein said cradle is folded on said main body, and a slanted position wherein the cradle is pivoted away from a back surface of said main body for supporting said main body and said sliding body in the slanted position, and said cradle slides with the sliding body when the sliding body is slid along the longitudinal length of the main body; and
a sliding guide module for guiding a face-to-face sliding motion of said sliding body along said main body;
wherein the main body is positioned between the sliding body and the cradle.

2. The mobile terminal as claimed in claim 1, wherein a surface of said sliding body is provided with at least a key and a display.

3. The mobile terminal as claimed in claim 1, wherein said cradle is openable and closable with respect to a part of a lower surface of said main body that is face-to-face with said cradle when said sliding body slides along said main body, or by pivoting between said flat position and said slanted position so as to fully open or close said back surface of said main body.

4. The mobile terminal as claimed in claim 1, wherein said cradle is pivotable between said flat position and said slanted position regardless of the sliding motion of said sliding body along the longitudinal length of the main body.

5. The mobile terminal as claimed in claim 1, wherein said cradle has a pivot provided at an edge of said back surface of said sliding body.

6. The mobile terminal as claimed in claim 1, wherein said cradle is plate-shaped.

7. The mobile terminal as claimed in claim 1, wherein said sliding body has an oblique flat lower end surface.

8. The mobile terminal as claimed in claim 7, wherein said sliding body is adapted to be slid manually.

9. The mobile terminal as claimed in claim 1, wherein said sliding body is adapted to be slid linearly.

10. The mobile terminal as claimed in claim 1, wherein said sliding guide module is disposed in said main body.

11. The mobile terminal as claimed in claim 1, wherein said sliding guide module comprises two symmetrical module parts disposed in said main body.

12. The mobile terminal as claimed in claim 11, wherein each of said module parts comprises:
a guide member;
a guided part mounted on said guide member so as to be guided along it; and
a resilient member arranged at a given region of said guide member for restraining free sliding motion of said guided part along said guide member.

13. The mobile terminal as claimed in claim 1, wherein said sliding guide module comprises:
a guide member;
a guided part mounted on said guide member so that said guide member is guided along said guide part; and
a resilient member arranged at a given region of said guide member for restraining free sliding motion of said guided part along said guide member;
wherein said resilient member is fully retained within said guided part.

14. The mobile terminal as claimed in claim 13, wherein said guide member comprises a rod-shaped member having a first and a second region of different diameters inserted in said guided part so as to guide sliding motion thereof, a third region formed between said first and second regions for stably mounting said resilient member, and a pair of fixture ends respectively extended outside said first and second regions.

15. The mobile terminal as claimed in claim 13, wherein said guide member, said guided part, and said resilient member form a module part.

16. The mobile terminal as claimed in claim 15, wherein said sliding guide module comprises a pair of symmetrical module parts in said main body.

17. The mobile terminal as claimed in claim 13, wherein said resilient member is a ring.

18. The mobile terminal as claimed in claim 1, further comprising a mechanism for mounting said sliding guide module for connecting said main body and said sliding body so as to hold said main body and said sliding body face-to-face, said sliding guide module having a guide member and a guided part mounted on said guide member so as to be guided by said guide member, said mechanism comprising:
   a guide reinforcement part for structurally reinforcing said guided part and for supporting movement of said guide member;
   a first guide step integrally formed with said guided part for slidably contacting said guide reinforcement part; and
   a second guide step integrally formed with said guide reinforcement part so as to engage said first guide step.

19. The mobile terminal as claimed in claim 18, wherein said first and second guide steps extend along said guided part and guide reinforcement part, respectively.

20. The mobile terminal as claimed in claim 18, wherein said guided part further includes a fastening piece extending lengthwise for fastening said guided part to said sliding body.

21. A mobile terminal comprising:
   a main body;
   a sliding body mounted on said main body, said sliding body being slidable along a longitudinal length of said main body;
   a cradle pivotably connected to said sliding body, said cradle being pivotable between a closed position wherein said cradle is folded on said main body, and a slanted position; and
   a sliding guide module for guiding the sliding of said sliding body along said main body;
   wherein said cradle is pivoted away from said main body for supporting said main body and said sliding body in the slanted position, and said cradle slides with the sliding body when the sliding body is slid along the longitudinal length of said main body; and
   wherein the main body is positioned between the sliding body and the cradle.

22. The mobile terminal as claimed in claim 21, wherein when said cradle is in the closed position, the cradle is inserted in a recess formed in a back surface of said main body.

23. The mobile terminal as claimed in claim 22, wherein said cradle forms a plane with the back surface when said cradle is closed.

24. The mobile terminal as claimed in claim 21, wherein the cradle device is pivoted around a pivot provided at a lower edge of said sliding body.

25. The mobile terminal as claimed in claim 21, wherein a lower end of said sliding body is formed as an oblique flat end surface whose slant angle determines the support angle of the cradle supporting the mobile terminal in the slanted position.

26. The mobile terminal as claimed in claim 25, wherein the sum of the slant angle of said lower end of said sliding body and a pivoting angle of said cradle is 90 degrees.

27. The mobile terminal as claimed in claim 21, wherein said sliding guide module comprises:
   a guide member;
   a guided part mounted on said guide member so as to be guided along it; and
   a resilient member arranged at a given region of said guide member for restraining free sliding motion of said guided part along said guide member.

28. The mobile terminal as claimed in claim 27, wherein said guided part further includes a fastening piece extending lengthwise for fastening said guided part to said sliding body.

29. The mobile terminal as claimed in claim 27, wherein said sliding guide module comprises:
   a guide reinforcement part for structurally reinforcing said guided part and for supporting the movement of said guide member;
   a first guide step integrally formed with said guided part for slidably contacting said guide reinforcement part; and
   a second guide step integrally formed with said guide reinforcement part so as to engage said first guide step.

30. The mobile terminal as claimed in claim 29, wherein said first and second guide steps extend along said guided part and guide reinforcement part, respectively.

* * * * *